TUNING VIBRATORY ELEMENTS

Filed Feb. 21, 1957

INVENTOR
Henry P. Birkemeier

BY
Burns, Doane, Benedict & Irons
ATTORNEYS

1

2,948,181

TUNING VIBRATORY ELEMENTS

Henry P. Birkemeier, Chicago, Ill., assignor, by mesne assignments, to Bell & Gossett Company, Morton Grove, Ill., a corporation of Illinois Filed Feb. 21, 1957, Ser. No. 641,751

11 Claims. (Cl. 84—409)

This invention relates generally to the field of tuning vibratory elements. More specifically, it relates to tuning vibratory elements and particularly those of the end mounted type generally described as reeds. It will be recognized that the tuning features of this invention are also adaptable for use with vibratory elements other than end mounted reeds.

The invention has specific application to the accurate and precise adjustment of the resonant vibration frequency of reeds as employed in resonant frequency responsive relays and fixed frequency tuning fork oscillators. As a part of the tuning features of this invention there is included a self-locking frequency altering clip frictionally retained on the vibratory element and adjustable longitudinally of such element upon release from its frictional engagement, the position of such clip on the element serving to impart a predetermined vibration frequency to the clip-carrying vibratory element.

As is well recognized in the art, resonant frequency responsive relays have been constructed to include as the vibratory element therein a reed which has one end rigidly mounted on a base. The reed is excited to vibration by impressing a signal on a drive coil mounted adjacent the reed having a frequency corresponding to the natural vibration frequency of the reed. Similarly, in fixed frequency tuning fork oscillators there have been provided vibratory elements which are driven at their resonant frequency and are positioned to vibrate in the flux field of the core of a pickup coil whereupon an output signal from the pickup coil is produced corresponding in frequency to the resonant frequency of the vibratory elements.

It is obvious that in assemblies as generally described above the accuracy of response in the case of frequency responsive relays and the stability and accuracy of the oscillator frequency in the case of tuning fork oscillators is primarily dependent upon the fixed resonant frequency of the vibratory elements associated with the particular assembly. In actual practice such vibratory elements must be tuned to within a fraction of a cycle. Thus, tuning to within one-tenth of one c.p.s. (cycle per second) of the desired frequency to which the relay is to respond, or which is to be the oscillator output frequency, is necessary. Achieving such a degree of accuracy in tuning the vibratory elements has been a tedious task in the past where generally it has been the practice to shorten the element or remove minute amounts of material therefrom by a trial and error method to arrive at the desired tuned frequency for the vibratory element. Such a tuning procedure is not only tedious but, if not carefully executed, may still fail to achieve the degree of accurate tuning desired or, in many cases, required for a particular application of the assembly in use.

It is, therefore, a primary object of the instant invention to enable accurate and precise tuning vibratory elements which are to have a definite fixed vibration frequency to properly operate in the assembly with which they are associated.

2

It is another object of this invention to provide a simple one-piece self-locking tuning clip which by reason of its resiliency is frictionally held on the vibratory element and is releasable to slide longitudinally of the vibratory element in tuning to the resonant frequency to provide a predetermined vibration frequency for such element.

An additional object of this invention is to provide a self-locking tuning clip which may be adjusted longitudinally of a vibratory element on which it is supported and having a bendable member carried by the clip to precisely set the vibration frequency of the vibratory element by bending the clip carried member toward or away from one end of the element after the clip is frictionally engaged with the element at the predetermined position to give the element the approximate of the desired vibration frequency.

It is also an object of this invention to provide an instrument cooperable between the base mounting a vibratory element and a resilient clip frictionally held on the element to release the clip from the element and permit precise sliding movement of the clip relative to the base of the element to accurately set the vibration frequency of the element.

A further object of this invention is to provide an instrument having manually actuatable arms for releasing a frequency altering clip held by its resiliency in frictional engagement with a vibratory element and adjustable means on the instrument engageable with the base of the element to precisely move the instrument and clip held thereby relative to the base mounting the element in the tuning operation.

Generally the invention as hereinafter described in detail, by reference to a specific embodiment shown on the accompanying drawing, embodies a one-piece elongated resilient body having spaced apertures with the vibratory element, such as an end mounted reed, passing through both of such apertures. The resiliency of the body tends to straighten the clip from its bent state, thereby urging opposite edges of the apertures to frictionally engage or bite into the longitudinal edges of the vibratory element. A bendable member carried by the clip may be provided to give precise frequency adjustment after the clip has been fixed at the closely approximate point for frequency adjustment of the vibratory element.

An instrument having generally parallel arms interconnected at adjacent ends and providing opposed clip-engaging surfaces at the opposite ends forms a part of this invention as employed to engage the opposite ends of the clip and move them toward one another to release the clip from its retained position on the vibratory element during the frequency tuning operation. The instrument includes adjustable stop means for limiting movement of the arms toward one another, which movement is effected when the clip is released from frictional engagement with the vibratory element. Further, the instrument is provided with adjustable means engageable with the mounting base of the vibratory element for effecting movement of the instrument and the clip with which it is engaged along the vibratory element for precise tuning of the vibratory element to the desired vibration frequency.

Other objects and advantages of the hereinafter described invention, in addition to those set forth hereinabove, will be apparent by reference to the specific description given hereinafter of one embodiment and its mode of application in this invention. In connection with the specific description, reference will be had to the accompanying drawing in which.

Figure 1:
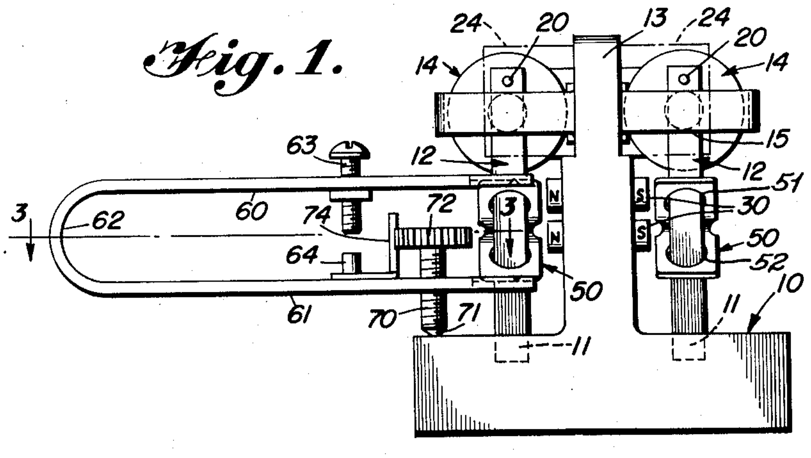
Figure 1 is a front elevational view of a frequency resonant relay showing frequency altering clips of the instant invention mounted on the vibratory elements of the relay and the adjusting instrument of this invention positioned to effect longitudinal tuning movement of one clip relative to the vibratory element on which it is mounted.

Merely by way of example, there is shown on the drawing a resonant frequency responsive relay with which the frequency altering clip and tuning instrument of this invention are employed. Specifically, a double frequency resonant relay is illustrated. The details of such relay may be generally described to facilitate explanation and understanding of the invention. It will be appreciated that the relay shown forms no part of the instant invention other than to illustrate the mode in which the vibratory reeds or elements of the relay are tuned to be responsive to a predetermined frequency signal.

The relay includes a base 10 which rigidly mounts the lower ends 11 of reeds or vibratory elements 12. An upstanding center post 13 has mounted thereon a pair of drive coils 14 with the poles 15 of the armatures of the drive coils disposed adjacent the respective vibratory elements 12.

Figure 2:
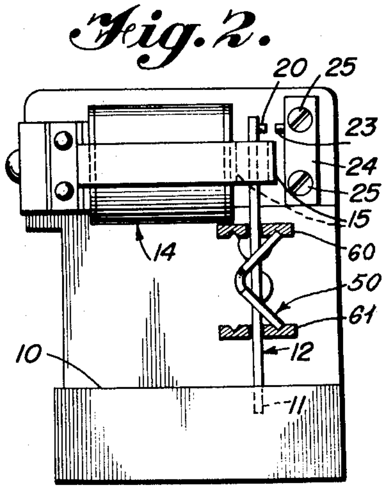
Figure 2 is a side elevational view showing a tuning clip positioned on a vibratory element and showing in section the arms of the tuning instrument relative to the vibratory element and clip.

The upper end of each vibratory element 12 carries a contact 20 and a stationary contact 23 is provided for each of the movable contacts 20. As shown in Figure 2, stationary contact 23 is mounted on a block 24 of suitable insulating material attached as by screws 25 to post 13 and positioned so that vibration of reed 12 will effect closing of contacts 21 and 23 to complete an electrical circuit to be affected by response of the relay. The stationary contacts and their mounting blocks are shown in phantom on Figure 1 to facilitate illustration of the position of the upper ends of the vibratory elements, poles associated therewith and drive coils.

In the double frequency relay illustrated the reeds 12 are polarized by means of polarizing magnets 30. This polarizing of the reeds makes the relay more sensitive, in that vibratory response of the reeds to the signal impressed on the drive coil for the respective reeds is quicker where the reeds themselves form in effect poles of a permanent magnet in the magnetic circuit of the polarizing magnets.

Briefly, the operation of the frequency resonant relay is as follows: Each of the vibratory elements 12 has a definite predetermined resonant vibration frequency as determined by characteristics of the element such as its length, weight distribution, material of which it is made, etc. Upon a signal having a frequency corresponding to the resonant vibration frequency of the vibratory element being impressed on the drive coil for such element, the magnetic flux between the poles of the drive coil with which the vibratory element is associated will excite the element to vibration at its resonant frequency. Vibration closes contacts 20 and 23 completing the circuit to be controlled by the relay. Thus, the relay responds to the signal having a frequency corresponding to the resonant vibration frequency of reed 12. In the specific embodiment illustrated two reeds are provided and two pairs of circuit closing contacts. Thus, each reed will be excited to vibration by a frequency signal corresponding to its resonant vibration frequency.

Figure 4:
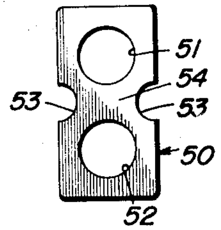
Figure 4 is a plan view of one of the tuning clips.

In the tuning of the vibratory elements of the frequency resonant relay as shown on the drawing, a self-locking frequency altering clip 50 is frictionally retained at a predetermined position on each of the vibratory elements. The formation of clip 50 is shown more clearly in Figure 4.

Figure 3:
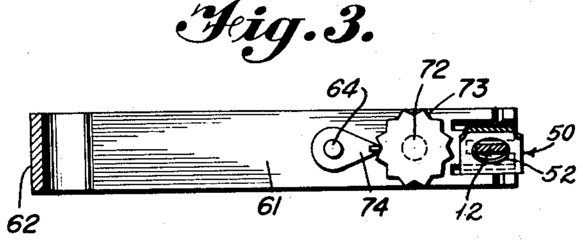
Figure 3 is a sectional view taken on line 3—3 of Figure 1, showing details of the tuning instrument and its relation to the frequency altering clip and vibratory element during tuning.

The clip is formed of an elongated resilient body having spaced apertures 51 and 52. The resilient body is notched at 53 along both longitudinal edges of the clip and the body transversely bent along a line 54 extending between the apertures. The bend is effected to partially align the apertures so that the vibratory element may pass through both apertures so that the clip will be positioned on the vibratory element as shown in Figures 1, 2 and 3. The resiliency of the clip tends to straighten the body from its bent state and thereby urge the opposite edges of the apertures 51 and 52 into firm engagement with the longitudinal edges of the vibratory elements 12 so that the clip is effectively retained at a predetermined position on the particular vibratory element.

In the embodiment shown, which illustrates a preferred form for the clip 50, the body may be formed of a resilient material which is either magnetic or nonmagnetic. The notches 53 are provided in the longitudinal edges to allow the body to bend more freely along the transverse line 54. Thus, the force created by the resiliency of the clip body is reduced by reason of a lesser amount of resilient material disposed at the bend line 54. Such a lower holding force may be an advantage in connection with thin vibratory elements or reeds and also in facilitating attachment of the clip to the vibratory element. It will be readily appreciated that where a heavier holding force is to be desired the edge notches 53 may be reduced in size or completely omitted.

It may be further pointed out that preferably the apertures 51 and 52 are circular so that as the clip is positioned on the vibratory element, which element has a generally rectangular cross-section, the periphery of the apertures will more effectively bite into the square corners of the vibratory element or reed. Also, by providing the apertures 51 and 52 in circular form, the clip will more easily clear the fixed contact 20 carried by the vibratory element as it is slid downwardly onto the element.

It will be recognized that as the weight of the clip 50 is moved toward the upper or free end of the vibratory element, the element will have a lower resonant frequency. By the same token, positioning the clip toward the lower end 11 of the vibratory element will result in the element having a higher vibration frequency. In its relaxed state the clip 50, by reason of the inherent resiliency of the elongated body, is frictionally retained on the vibratory element with the peripheral edges of apertures 51 and 52 biting into the square corners of the vibratory element. To release the clip from such frictional engagement the opposite ends of the clip body are moved toward one another, tending to align the apertures 51 and 52 to a greater extent. As so released, the clip may be moved up or down along the vibratory element to the point where it is to be positioned to impart to the vibratory element the appropriate resonant vibration frequency.

An instrument is provided as a part of this invention to release the clip 50 from its vibratory element and effect precise adjustment of the clip along its vibratory element as undertaken in the tuning operation. The instrument includes generally parallel arms 60 and 61 interconnected at 62 to be normally biased away from each other and with the outer free ends thereof providing opposed surfaces for engagement with the opposite ends of clip 50. As shown in Figure 1, arm 60 threadably carries a stop screw 63, the end of which is disposed opposite an abutment 64 mounted on arm 61. Screw 63 is adjustable to limit movement of arms 60 and 61 toward each other as effected in releasing clip 50 from its vibratory element. It will be appreciated that such a limit stop insures that when arms 60 and 61 are forced together to release the clip, the clip will not be excessively compressed to an extent that the clip body will be distorted and bent along line 54 beyond the elastic limit of the body material. Thus, in using the instrument, with its outer free ends engaged with a clip, the arms 60 and 61 are manually urged together until the end of stop screw 63 engages abutment 64. In this condition the clip 50 will be released from its vibratory element but the ends of the clip will not have been moved together to excessively bend the clip body.

Figure 5:
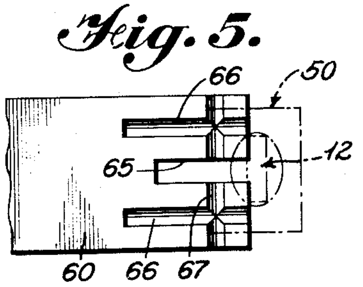
Figure 5 is an elevational view of one of the opposed clip-engaging surfaces of the tuning instrument illustrating its formation for cooperation with the end of the tuning clip.

The opposed surfaces on the arms 60 and 61 which engage the opposite ends of clip 50 may be appropriately grooved as shown more clearly in Figure 5. Also, the ends of arms 60 and 61 are slotted at 65 to accommodate the passage of the vibratory element when the instrument is employed in the manner as shown in Figures 1, 2 and 3. The grooves 66 as shown in Figure 5, which extend parallel to the longitudinal edges of the arm 60, function to receive and retain the end of clip 50 when the instrument is employed as shown in Figures 1, 2 and 3. The transverse groove 67 may be provided to engage with the end of clip 50 when the tool is used in a structure where the vibratory element and clip are approached to be positioned as shown in phantom on Figure 5. In other words, where the vibratory element does not pass through slots 65, but rather lies across the end of arm 60, the opposite ends of the clip 50 may be retainingly engaged in appropriate transverse grooves such as shown at 67 in Figure 5.

Once the clip has been released from its frictional engagement with the vibratory element on which it is positioned by moving the arms 60 and 61 together, the fine and precise adjustment of the clip, by moving it along the vibratory element, is effected by means of an adjusting member 70 threaded through arm 61 and having the lower end 71 engaged with the base on which the vibratory element is mounted. As will be recognized from the structure shown in Figure 1, member 70 limits downward movement of the tuning instrument. Further, by rotation of member 70 the instrument and the clip 50 carried thereby may be precisely raised and thereafter arms 60 and 61 released to lock the clip at the proper position along the length of its vibratory element to tune the vibratory element to its desired vibration frequency.

Member 70 is provided with a head 72 having a serrated periphery 73. A resilient retainer 74 is mounted on arm 61 with the end thereof resiliently engaging the serrated periphery 73 of head 72. It will thus be appreciated that rotation of head 72 may be manually effected to move the instrument upwardly and retainer 74 will serve to hold the head and member 70 against accidental rotation until manual movement is undertaken. It will of course be recognized that should adjustment of the resonant frequency for the vibratory element dictate that clip 50 be moved downwardly to increase the vibration frequency, the member 70 may be threaded upwardly to permit the instrument carrying clip 50 to move down by manual pressure applied thereto. The head 72 may be suitably graduated to permit calibrated adjustment of the clip position to be made by rotation of the head a predetermined number of graduations to secure a particular frequency response change for the clip-carrying vibratory element.

Essentially the modified tuning clip of Figure 6 possesses characteristics similar to those of the clip described in detail hereinabove. Thus, the clip 80 of Figure 6 has an elongated resilient body having spaced apertures 81 and 82 with the body being notched at 83 and transversely bent along a line 84. The bend is effected, as in the case of the previously described clip embodiment, to partially align the apertures so that the vibratory element may pass through both apertures and the resiliency of the body will urge the edges of the apertures to engage with the vibratory element in holding the clip on the element.

The apertures 81 and 82 are provided with notches 85 at opposite sides thereof with the notches of both apertures 81 and 82 being longitudinally aligned with respect to the clip body. This formation of the apertures in the clip facilitates positioning of the clip perpendicular to the general plane of the reed, although this clip may also be positioned parallel to the plane of the reed if desired. Preferably the notches 85 are rounded so that the edges thereof, when the clip is positioned on the vibratory element, tend to bite into the square corners of the element and more effectively hold the clip on the element as in the case of the hereinabove described clip embodiment. If desired, the apertures 81 and 82 may have an oblong configuration such that the rounded ends of such oblong apertures engage the square corners of the vibratory element on which the clip is positioned. With such oblong apertures the width of the clip may be less and the clip used with vibratory elements that do not carry contacts over which the clip must pass in being positioned on the element.

Figure 6:
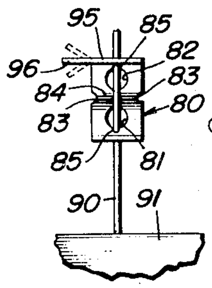
Figure 6 is an elevational view of a modified tuning clip mounted on a vibratory element.

As shown in Figure 6, clip 80 is positioned on a vibratory element 90 which takes the form of a vibrating reed. The reed has one end thereof mounted in a suitable base 91. Further, as shown in this figure, showing the edge of element 90, the clip is positioned so as to be disposed generally perpendicular to the plane of the reed.

The form of tuning clip of Figure 6 is particularly adapted for use with relatively thin reeds for low frequencies. Thus, it will be appreciated that with the clip positioned generally perpendicular to the plane of the reed, the resiliency of the clip tending to frictionally hold it on the reed will not distort the reed, even though the reed may be relatively thin.

As a further feature of the tuning clip of this invention, such feature being shown associated with clip 80 in Figure 6, there may be provided a bendable member 95 secured as shown in Figure 6 along the underside of one end of the clip body. This member may project laterally outwardly from one or both sides of the clip and, as shown in Figure 6, has an outwardly projecting portion 96.

The provision of the bendable member provides what may be termed a vernier adjustment for precisely fixing the vibration frequency of the vibratory element. Thus, once the tuning clip has been longitudinally adjusted on the vibratory element to give the element a vibration frequency closely approximating the desired frequency, the projecting portion 96 may be bent away from or toward the end of the vibratory element to tune the reed to the precise desired vibration frequency. By bending projecting portion 96 to the upper dotted line position as shown in Figure 6 the resonant frequency of the vibratory element 90 will be lowered. By the same token, bending the projecting portion 96 to the lower dotted line position in Figure 6 will have an effect of raising the resonant vibration frequency of the vibratory element. It will of course be appreciated that the bendable member feature shown in conjunction with clip 80 may just as well be incorporated into the hereinabove described embodiment of clip 50.

In connection with the frequency altering clips, as described in detail hereinabove, it may be pointed out that the vibratory elements or reeds as presently employed in a variety of frequency resonant relays or fixed frequency reed oscillators have the same width for a range of frequencies, while the thickness of the individual reeds will be different for frequencies within the range. Generally these reeds are made with vibration frequencies differing by about 40 c.p.s. Thus, one size frequency altering clip may be used with vibratory elements or reeds which will cover a range of frequencies from 300 c.p.s. to 900 c.p.s. Similarly, heavier frequency altering clips can be used to vary the frequencies where a greater range is involved.

With regard to the practice employed in connection with the herein described vibratory elements or reeds as used in various assemblies, the reeds are pre-tuned or cut to their approximate frequency prior to mounting in the assembly. Subsequently a frequency altering clip is associated with each reed and used to tune the reed to within a fraction of a c.p.s. In this tuning operation, as preferably effected by use of the instrument as described hereinabove, the degree of rotation of member 70 will determine the amount of raising or lowering of the clip relative to its vibratory element. After the clip has been relocated, the frequency of the clip-carrying vibratory element is determined by a suitable frequency counter to verify that it has the desired resonant frequency response. It will of course be appreciated that the instrument is removed from engagement with the clip at the time the frequency check is made and that if the proper vibration frequency is not precisely obtained by the initial positioning of the clip, the instrument may be reapplied to release the clip and such clip be relocated in the position to achieve proper frequency response of the vibratory element.

Although the particular instrument disclosed herein has been found highly effective in releasing frequency altering clips and precise adjustment thereof, it will be readily recognized that other suitable means may be employed in adjusting the position of the clip along the vibratory element on which it is mounted. Also with respect to the specific configuration of the clip, it will be appreciated that other configurations of the clip may be employed within the scope of this invention as covered by the appended claims.

Having thus described my invention, what I claim is:

1. An adjustable frequency vibratory element comprising a base, an elongated vibratory reed having one end thereof secured to said base, a frequency altering clip frictionally held at a predetermined position on said reed and vibratable in unison with said reed, said clip including a resilient body having a pair of spaced apertures therein, said body being bendable transversely to place said apertures in partial alignment and said vibratory reed extending through both of said apertures, the resiliency of said body tending to straighten said body from its bent state and thereby urge the opposite edges of said apertures to frictionally engage with the reed to hold said clip in place on said reed, said clip being releasable from said reed by movement of the opposite ends thereof toward one another whereby said clip may be located longitudinally of said reed to result in the clip-carrying reed having a predetermined desired vibration frequency.

2. An adjustable frequency vibratory element as recited in claim 1 wherein said apertures are circular.

3. An adjustable frequency vibratory element as recited in claim 1 wherein the side edges of said body are notched inwardly at the ends of the transverse bend.

4. An adjustable frequency vibratory element as recited in claim 1 wherein a bendable member is provided on said clip to provide for precise adjustment of the vibration frequency of the vibratory element.

5. In apparatus provided with an elongated vibratory element having one end thereof secured to a base and carrying a frequency altering clip frictionally held at a predetermined point along the length of the element wherein the clip is formed of a resilient body with spaced apertures and bent transversely intermediate the apertures to accommodate the passage of the element through both of the apertures, an instrument having a pair of generally parallel arms connected at adjacent ends and normally biased away from each other while being movable toward one another by force applied at a point spaced from the connected ends, the outer free ends of said arms providing opposed surfaces to cooperate with the opposite ends of the frequency altering clip so that movement of said arms toward one another with said surfaces engaged with the clip effects release of the clip from frictional engagement with the vibratory element, means carried by one of said arms to position said instrument relative to the base and including a member to engage with a surface having a fixed position relative to the base mounted end of the element, said member being movable relative to said one arm to move the instrument and clip with which it is engaged along the vibratory element in adjusting the vibration frequency of the element.

6. In apparatus as recited in claim 5 wherein said member is threadably engaged with said one arm.

7. In apparatus as recited in claim 6 wherein a serrated head is provided on said member and a resilient retainer provided on said one arm engaged with the serrated periphery of said head to restrain said member to maintain its adjusted position.

8. In apparatus as recited in claim 5 wherein adjustable stop means is provided between said arms to limit movement of said arms toward one another.

9. In apparatus as recited in claim 5 wherein said opposed surfaces are grooved to receive the opposite ends of the frequency altering clip.

10. An adjustable frequency vibratory element comprising a base, an elongated vibratory reed having one end thereof secured to said base, and a frequency-altering clip frictionally engaged with said reed at a predetermined position thereon and vibratable in unison with said reed, said clip having a pair of spaced apertures therein through which said reed extends and including a resiliently distortable section intermediate said apertures, said section being distortable to a stressed condition in which said apertures are aligned sufficiently to accommodate relative endwise movement of the reed and clip, and said section tending to assume an unstressed condition in which said apertures are out of alignment such that portions of said clip bordering opposite edges of said apertures frictionally engage the reed to retain the clip in place on said reed during free vibration thereof.

11. An adjustable frequency vibratory element as recited in claim 10 wherein a bendable member is provided on said clip to provide for precise adjustment of the vibration frequency of the vibratory element.

References Cited in the file of this patent

UNITED STATES PATENTS

| | | |
|---|---|---|
| 329,090 | Segrove | Oct. 27, 1885 |
| 1,269,511 | Roberge | June 11, 1918 |
| 2,015,014 | Hoschke | Sept. 17, 1935 |
| 2,123,425 | Kelley | July 12, 1938 |